United States Patent
Vander Lind et al.

(10) Patent No.: US 10,054,954 B1
(45) Date of Patent: Aug. 21, 2018

(54) POWER SURGE LANDING SYSTEM

(71) Applicant: Kitty Hawk Corporation, Mountain View, CA (US)

(72) Inventors: Damon Vander Lind, Oakland, CA (US); Gregory Mainland Horn, Mountain View, CA (US); Thomas Van Alsenoy, San Francisco, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 21 days.

(21) Appl. No.: 15/447,029

(22) Filed: Mar. 1, 2017

(51) Int. Cl.
| | |
|---|---|
| *G05D 1/06* | (2006.01) |
| *B64C 29/00* | (2006.01) |
| *B64D 31/06* | (2006.01) |
| *B64D 45/04* | (2006.01) |
| *G06F 19/00* | (2018.01) |

(52) U.S. Cl.
CPC ....... *G05D 1/0676* (2013.01); *B64C 29/0033* (2013.01); *B64D 31/06* (2013.01); *B64D 45/04* (2013.01)

(58) Field of Classification Search
CPC .. G05D 1/0676; B64C 29/0033; B64D 31/06; B64D 45/04
USPC ....... 701/3, 14–17, 123; 244/100 R; 340/981
See application file for complete search history.

(56) References Cited

U.S. PATENT DOCUMENTS

| | | | |
|---|---|---|---|
| 7,487,939 B1 * | 2/2009 | Christof | B64D 17/80 244/139 |
| 9,639,087 B1 * | 5/2017 | Cutler | G05D 1/0676 |

OTHER PUBLICATIONS

Landing Flare. From Wikipedia, the free encyclopedia. Oct. 3, 2016.

\* cited by examiner

*Primary Examiner* — Gertrude Arthur Jeanglaud
(74) *Attorney, Agent, or Firm* — Van Pelt, Yi & James LLP (57) ABSTRACT

An aircraft landing system is disclosed. In various embodiments, an aircraft landing system as disclosed herein includes a processor that determines to start a final stage of descent for the aircraft. The processor determines a set of commands for actuators of the aircraft, based on the determination to start the final stage of descent, to flare the aircraft while wings of the aircraft are substantially in a forward flight position followed by transitioning to a vertical tilt position and completing the landing in substantially vertical flight. The commands are provided to the actuators of the aircraft.

20 Claims, 10 Drawing Sheets

POWER SURGE LANDING SYSTEM

BACKGROUND OF THE INVENTION

Landing an aircraft may require large amounts of power over a long period of time. Landing an aircraft may cause the aircraft's engine to overheat. Traditional methods of landing may be susceptible to human error or safety issues.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A power surge aircraft landing system is disclosed. The system comprises a processor configured to determine to start a final stage of descent for the aircraft. The processor also is configured to determine a set of commands for actuators of the aircraft, based on the determination to start the final stage of descent, to flare the aircraft while wings of the aircraft are substantially in a forward flight position followed by transitioning to a vertical tilt position and completing the landing in substantially vertical flight. For example, the wings may be substantially parallel to ground in the forward flight position and may be substantially vertical or tilted away from the aircraft in the vertical tilt position. The processor then provides the set of commands. In some embodiments, the processor automatically determines to start a final stage of descent for the aircraft in the event the aircraft is substantially close to ground. The processor may be configured to automatically determine to start an initial stage of descent for the aircraft and later automatically determine to start a final stage of descent.

In some embodiments, the aircraft landing system executes a bird-like landing process. For example, a bird flies close to the ground before rapidly flapping its wings and landing. The system may initially cause the aircraft to dive. The aircraft may use minimal amounts of battery power while in an initial dive. After the aircraft has dove close to ground, the system may be triggered to provide instructions for final descent. The aircraft may automatically determine to provide instructions for final descent or may receive a pilot indication. In final descent, the system may command the aircraft to sharply pull away from ground. Large amounts of power may be used during final descent. Final descent may take course over a short period of time, such as a few seconds. The power surge landing system may target a landing site and plan the trajectory of the aircraft to maximize use of the aircraft's wings, minimize energy use, and land with little to no forward speed. The aircraft landing system may enable the aircraft to land in an automated, power-efficient, safe, planned, and controlled manner. The system may enable the aircraft to land in a predetermined spot without rolling or skidding. The aircraft landing system may control rotors and tiltwings of an aircraft during the landing process. Manually controlling the aircraft to land may be imprecise or require greater battery power.

Figure 1:
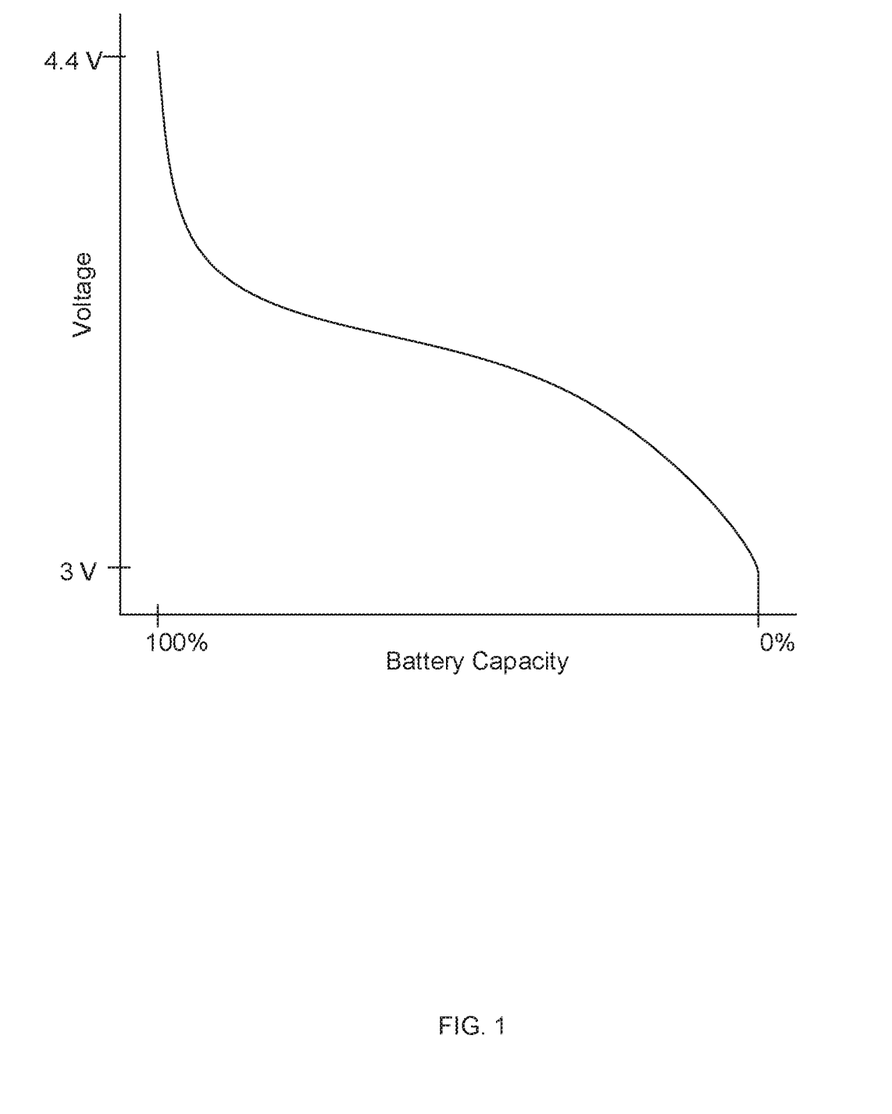
FIG. 1 is a diagram illustrating an embodiment of an aircraft's battery discharge curve.

FIG. 1 is a diagram illustrating an embodiment of an aircraft's battery discharge curve. The power surge landing system may be utilized in electric aircraft. Electric aircraft may be powered by one or more batteries. The one or more batteries may discharge according to the pattern shown. As shown, when 100% of the battery capacity is available, the battery provides 4.4 Volts. Towards the end of the battery's life, when around 5% of the battery capacity is available, the battery provides 3 Volts. Towards the end of a battery's charge, the voltage supplied may drop off quickly. The battery may have limited or low power capabilities when it is closed to be being fully drained.

In some embodiments, a battery that powers an electric aircraft is not recharged while the aircraft is airborne. Towards the end of an aircraft's flight, the aircraft's batteries may be drained to low levels. At the low levels, the amount of power that the batteries are able to supply may be limited. Traditional landing systems may require a large amount of power. In a traditional landing system, the aircraft may hover and slowly approach ground. Hovering may induce risks of overheating the aircraft's systems, overloading the aircraft's motors, or destabilizing the aircraft. For example, an aircraft may be easily disturbed while hovering by a gust of wind. In some embodiments, the aircraft may be forced to begin descend when the batteries are 50% capacity or more in order to ensure enough battery power is available for the landing process.

Figure 2:
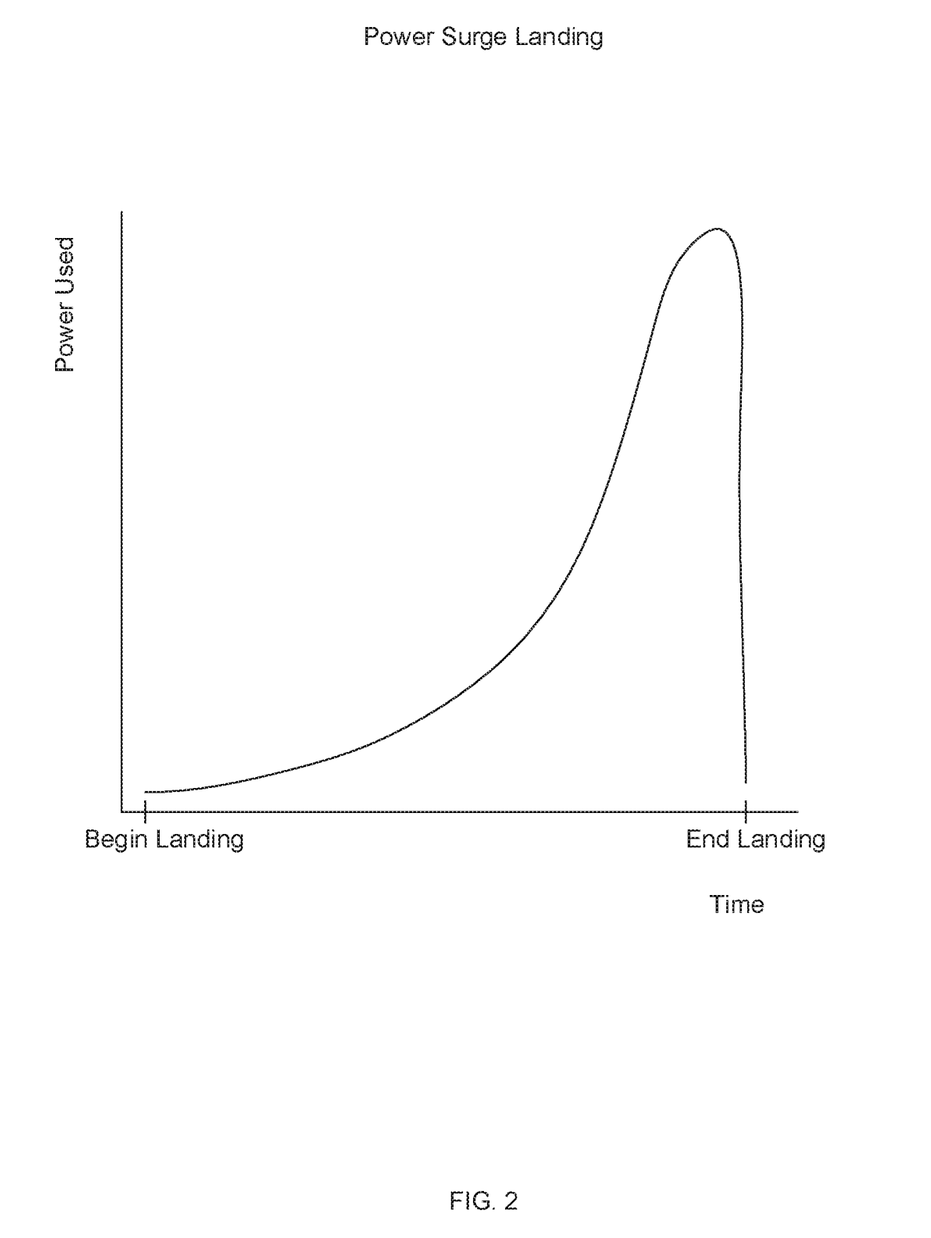
FIG. 2 is a diagram illustrating an embodiment of power used by an aircraft utilizing a power surge landing system.

FIG. 2 is a diagram illustrating an embodiment of power used by an aircraft utilizing a power surge landing system. The graph shows power used by the aircraft throughout landing. The amount of power used is low in the beginning of the landing process and spikes near the end of the landing before dropping to zero. A power surge landing system may direct an aircraft to dive until the aircraft is almost at ground. The aircraft may be in cruise while it dives down. Cruising may cool down aircraft components and safeguard against overheating. The aircraft may retain velocity in cruise and be relatively resistant to disturbances. A short distance above ground, the aircraft may be reared back at full power for a short period of time. Applying a large amount of power in a short period of time may provide less heat to the engine and other critical aircraft components than applying a lower amount of power over a long period of time as in traditional landing.

In a traditional landing, the aircraft may utilize a large amount of power through the entire landing. The power surge landing system may execute a landing that conserves power overall compared to a traditionally executed landing that involves hover. The power surge landing system may allow the aircraft to fly further than a traditional landing system, because a smaller amount of battery power needs to be conserved for landing.

Figure 3:
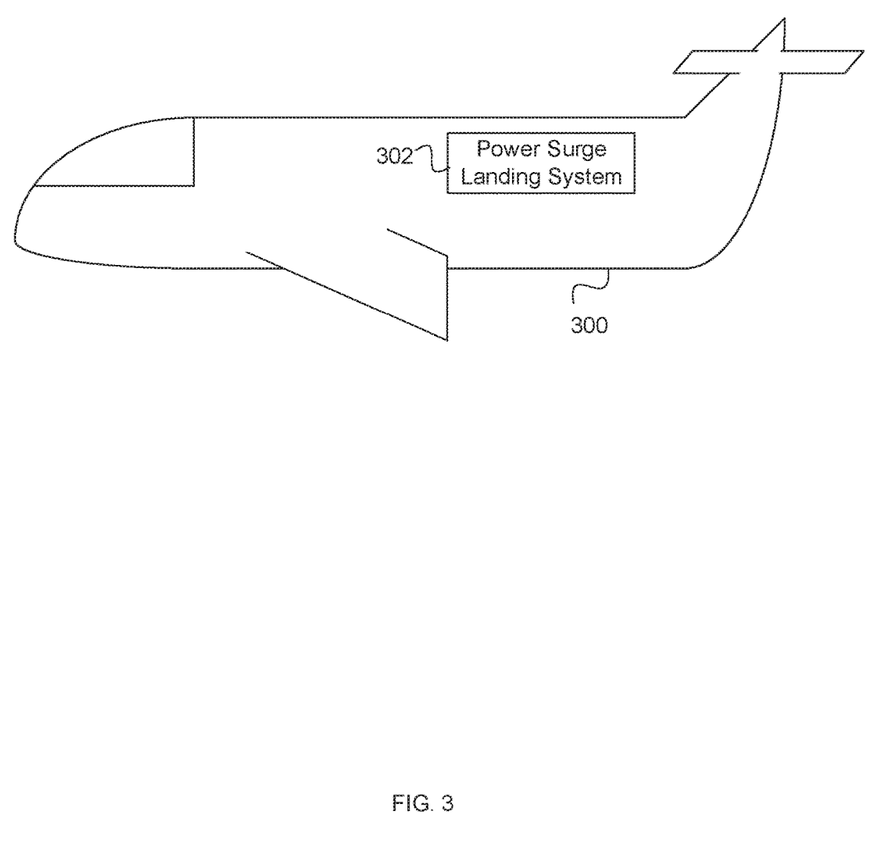
FIG. 3 is a diagram illustrating an embodiment of an aircraft comprising a power surge landing system.

FIG. 3 is a diagram illustrating an embodiment of an aircraft comprising a power surge landing system. In the example shown, aircraft 300 comprises power surge landing system 302. Power surge landing system 302 may be stored in aircraft 300. In some embodiments, power surge landing system 302 comprises components that are wired up to different parts of the airplane, such as the tail, wings, and flaps.

Figure 4:
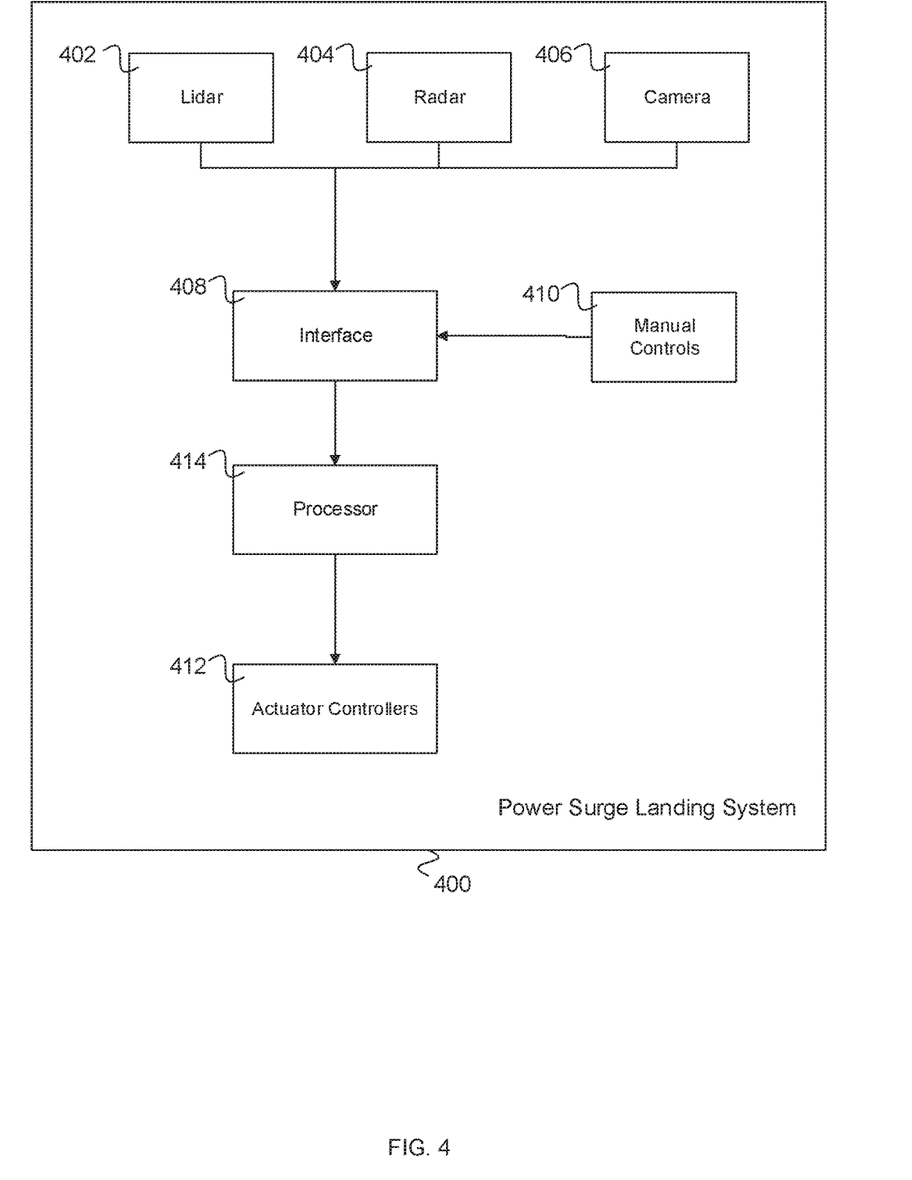
FIG. 4 is a diagram illustrating an embodiment of a power surge landing system.

FIG. 4 is a diagram illustrating an embodiment of a power surge landing system. The power surge landing system may automate the power surge landing method in the aircraft. Landing the aircraft in a power surge method (e.g. diving and pulling away at maximum power levels close to ground) may be difficult, unsafe, or unfeasible to be performed manually. The system may cause the aircraft to converge at ground at a predetermined rate, begin tilt, slam to full upwards tilt at a specific moment above ground, and kill throttle as soon as the aircraft touches ground. The system may determine the correct timing of actions and execute them accurately. Landing the aircraft in a power surge method manually may be unpredictable or unsafe.

In the example shown, power surge landing system 400 comprises lidar 402, radar 404, camera 406, interface 408, manual controls 410, processor 414, and actuator controllers 412. Lidar 402, radar 404, and camera 406 may be affixed to the aircraft. In some embodiments, the aircraft comprises one or more sensors. The lidar, radar, camera, and any other appropriate sensor may collect sensor data related to the aircraft. The sensor data may comprise a distance from ground, acceleration or velocity, degree of tilt, or any other appropriate information. The sensor data may comprise information regarding obstacles that may prevent the aircraft from landing or diving in specific areas. Sensor data may be provided by lidar 402, radar 404, and camera 406 to interface 408.

Interface 408 may also receive instruction from manual controls 410. Manual controls 410 may comprise one or more inceptors that a pilot is able to manipulate. For example, a joystick, a button, a lever, an electrical mechanism, or a mechanical mechanism may be accessible to the pilot. The pilot may initiate a landing sequence, direct the aircraft towards a new landing location, or any other appropriate action.

Received data may pass from interface 408 to processor 414. Processor 414 may determine a stage of descent for the aircraft based on sensor data and other data received. In some embodiments, the processor is provided a desired landing location. The processor may determine when to proceed with each stage of descent based on the provided landing location. Sensor data, such as wind speed, may be considered. Aircraft limitations such as maximum throttle levels may be considered. In the event sensor data reveals an obstacle such as high winds or other airborne objects in the aircraft's trajectory, the processor may determine a new trajectory for the aircraft. The processor may direct the aircraft to fly to a new location and approach the landing location from a different angle.

In some embodiments, the processor may determine to initiate descent. The processor may initiate descent in the event the aircraft battery levels are low, the aircraft is experiencing a component malfunction, or any other appropriate situation. The processor may initiate descent based on sensor information.

Processor 414 may provide instructions to actuator controllers 412. Actuator controllers 412 may control actuators of the aircraft. Actuators may comprise a flap, a rotor, or any component of the aircraft that changes its trajectory. The actuator controllers may be electrical. The processor may be wired to the actuators or actuator controllers.

Figure 5A:
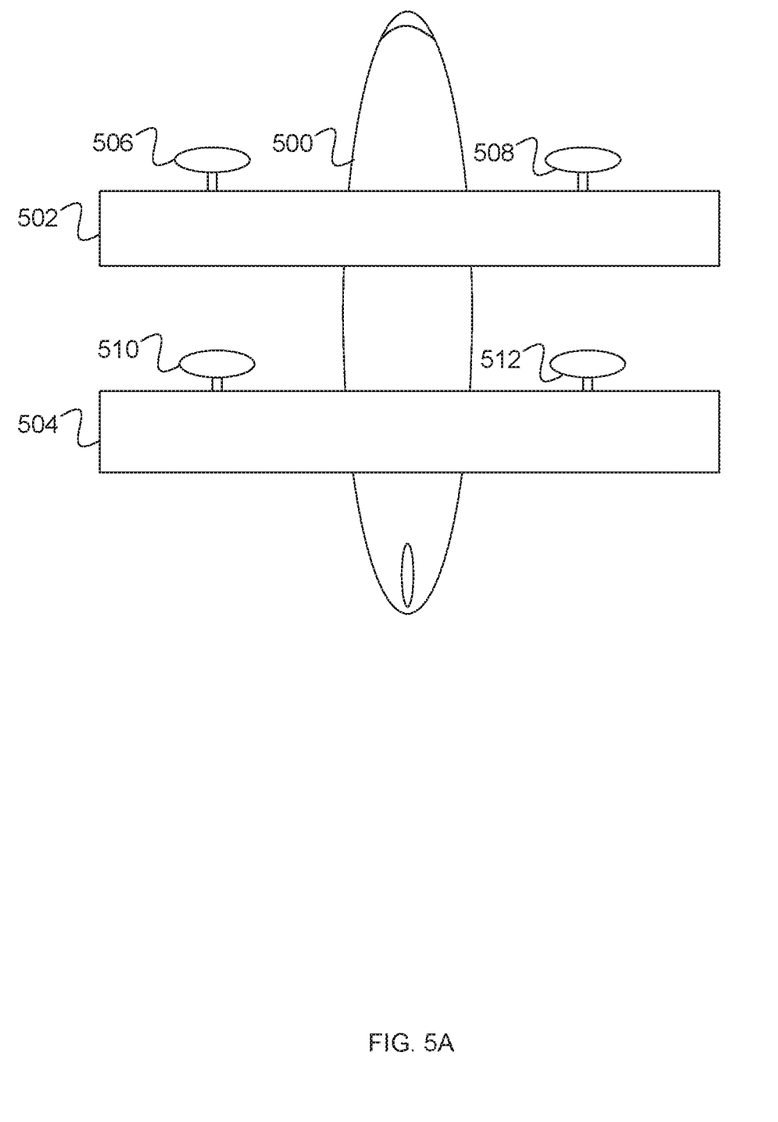
FIG. 5A is a diagram illustrating an embodiment of an aircraft comprising a power surge landing system.

FIG. 5A is a diagram illustrating an embodiment of an aircraft comprising a power surge landing system. In some embodiments, the power surge landing system is utilized in electric aircraft. Electric aircraft may have reduced power abilities compared to non-electric aircraft. Electric aircraft may require a landing system that utilizes a low amount of power such as the power surge landing system.

In some embodiments, the power surge landing system is utilized in a small form factor aircraft. Smaller aircraft may have lower wing loading. Smaller aircraft may be more aerolastic than large aircraft or have a higher weight to thrust mass ratio. The power surge landing system may be utilized in a winged aircraft, rotor-powered aircraft, multi-rotor aircraft, or mixed-mode aircraft.

The power surge landing system may utilize all of an aircraft's available actuators in each stage of descent. The system may adapt to various configurations of aircraft. The actuators of the aircraft may be configured to optimize the position of the aircraft for each stage of descent. In some embodiments, the power surge landing system is utilized in a tiltwing aircraft with multiple rotors. Aircraft 500 as shown comprises wings 502 and 504. Rotors 506 and 508 are affixed to the front of wing 502. Rotors 510 and 512 are affixed to the front of wing 504. Rotors 506 and 510 are to the left of the fuselage of the aircraft as shown and rotors 508 and 512 are to the right of the fuselage. Wings 502 and 504 may be capable of tilting up to 90 degrees, perpendicular to the fuselage. The rotors may face upwards when the wings are fully tilted. The wings and rotors may be utilized by the power surge landing system.

Figure 5B:
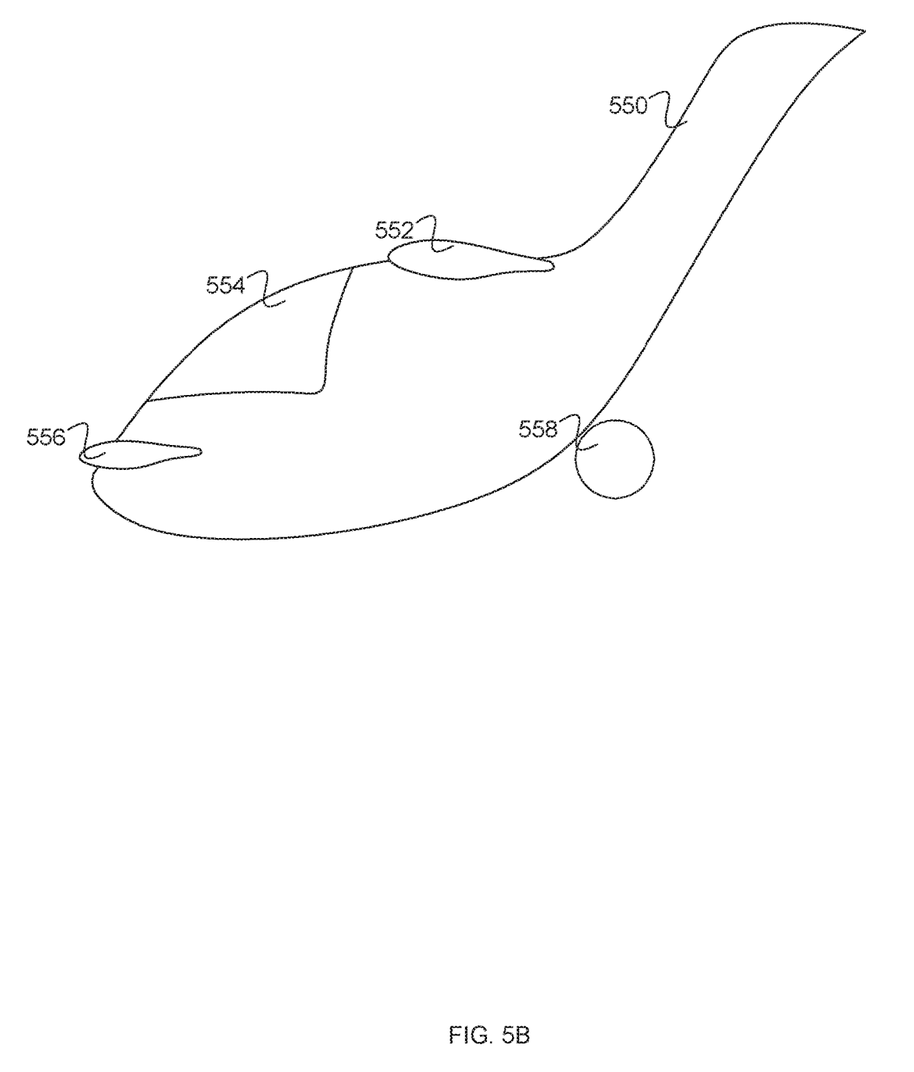
FIG. 5B is a diagram illustrating an embodiment of an aircraft comprising a power surge landing system.

FIG. 5B is a diagram illustrating an embodiment of an aircraft comprising a power surge landing system. In some embodiments, the power surge landing system is used in a fixed wing aircraft. In the example shown, aircraft 550 comprises wings 552 and 556. The wings may be fixed on the aircraft at a predetermined angle. The wings may be fixed at a shallow angle from the aircraft's fuselage. As shown, wing 552 is attached to a fuselage of the aircraft towards the back of cockpit window 554. Wing 556 is attached near the nose of the aircraft, below cockpit window 554. In the example shown, aircraft 550 comprises wheel 558. The aircraft may pivot on one or more wheels. The power surge landing system may command the aircraft to dive or pull up in order to change the wings' angles from ground during landing. In some embodiments, the aircraft may land in a tilted position wherein the aircraft's nose is tilted away from the ground. After touching ground, the aircraft's fuselage may pivot on the one or more wheels until it is upright or parallel to ground.

Figure 6A:
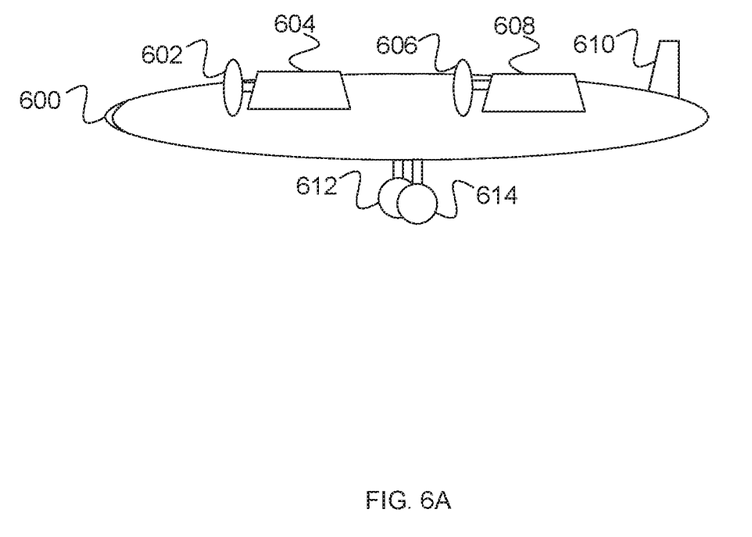
FIG. 6A is a diagram illustrating an embodiment of a tiltwing aircraft in a neutral wing position.

FIG. 6A is a diagram illustrating an embodiment of a tiltwing aircraft in a neutral wing position. In the example shown, aircraft 600 is shown from a side view. Rotors 602 and 608 are directed toward the nose of the aircraft. Wings 604 and 608 are in a traditional position. The wings may lie flat atop the aircraft. The aircraft comprises tailpiece 610. The fuselage of the aircraft is supported by wheels 612 and 614. The aircraft may be configured to have a neutral wing position while cruising.

Figure 6B:
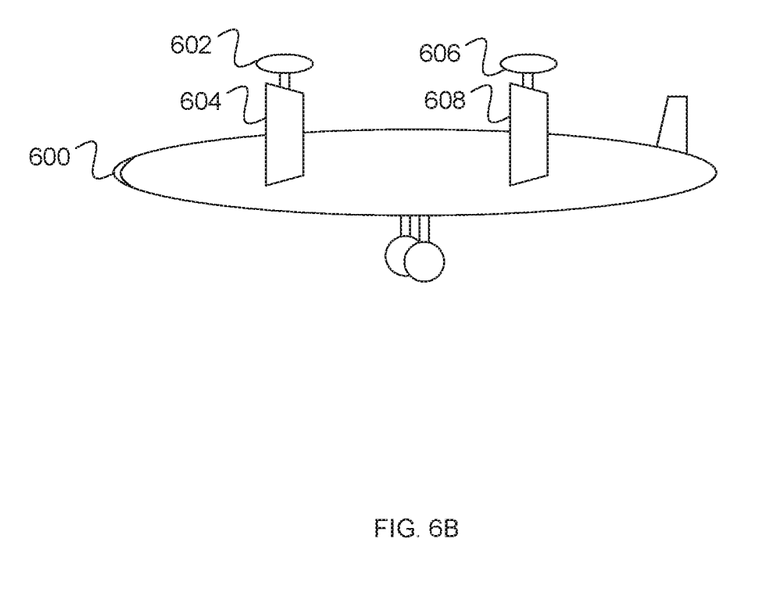
FIG. 6B is a diagram illustrating an embodiment of a tiltwing aircraft in a tilted wing position.

FIG. 6B is a diagram illustrating an embodiment of a tiltwing aircraft in a tilted wing position. In the example shown, the wings of aircraft 600 are fully tilted. The wings may be tilted upwards and back. Wings 604 and 608 are normal to aircraft 600. Rotors 602 and 606 are parallel to ground.

Figure 7A:
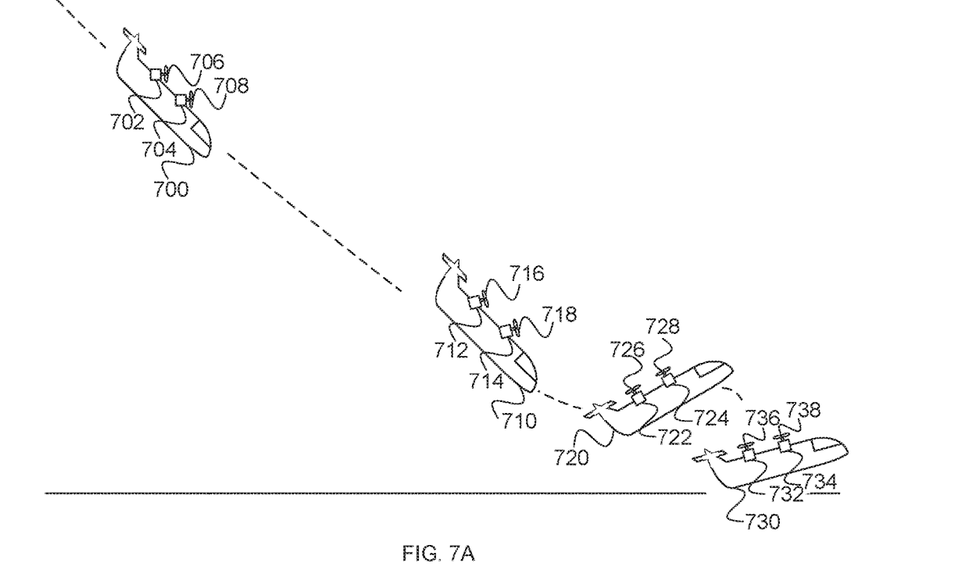
FIG. 7A is a diagram illustrating an embodiment of a landing process enacted by a power surge landing system in a tiltwing aircraft.

FIG. 7A is a diagram illustrating an embodiment of a landing process enacted by a power surge landing system in a tiltwing aircraft. The entire landing run may be shorter than a traditional landing run. The system may automatically direct an aircraft through the positions shown. Positions 700, 710, 720, and 730 show an aircraft in different stages of descent.

Position 700 may illustrate an initial stage of descent. In the initial stage of descent, the power surge landing system may instruct the aircraft to dive or to approach at a stabilized speed and descent angle with low, none, or negative power consumption. In position 700, the aircraft is angled towards ground. The aircraft may utilize minimal amounts of power in the initial stage of descent. In some embodiments, the motors and motor controllers are capable of substantially more power over very short time periods, possibly up to double of steady-state power for a few seconds. In the initial stage of descent, descent through blown windborne flight may be used to reduce motor load during the initial transition from forward flight to hover to reduce the time and the initial heating of the power system prior to the final use of power at extremely low speeds. For example, a vehicle may use half of hover power to generate lift at a 7 m/s forward flight speed.

The initial stage of descent may be triggered based on a pilot indication. The system may determine when to begin descent based on a target landing area. The power surge landing system may instruct the aircraft to maintain a dive or initial descent position for the majority of the landing approach. Prior to descent, wings 702 and 704 may be in a neutral position. In the initial stage of descent, the power surge landing system may instruct wings 702 and 704 to begin to tilt away from a neutral position. As shown, wings 702 and 704 are tilted slightly away from parallel. In some embodiments, no power is supplied to rotors 706 and 708. The combination of wing and rotor lift with some forward speed may be able to support the vehicle down to a low landing speed. Below the low landing speed, gravity may cause the aircraft to fall towards ground. The aircraft may apply a large amount of power to slow the aircraft as it falls, allowing the aircraft to slowly accelerate towards the ground in an arc. The trajectory of speed, tilt, control inputs, and altitude may be optimized to allow the aircraft to touch down accurately in a planned position.

Position 710 may illustrate the beginning of a final stage of descent. The aircraft may be flying in at the edge of stall, and at 710, a short burst of power is applied. In some embodiments, the burst of power is applied for only a few seconds or long enough for the aircraft to fly about 10 meters before the aircraft lands. In the final stage of descent, the aircraft may pull sharply upwards, away from the ground. The aircraft may pull upwards to better orient the propellers to counter gravity. The aircraft may transition into a vertical flight position and complete the landing in substantially vertical flight. For example, a fixed wing aircraft may be substantially parallel to ground with its wings substantially parallel to ground. A tiltwing aircraft's wings may be tilted at a vertical angle. The aircraft may pull away from the ground at maximum power. The throttles may be ramped up. As shown, the nose of the aircraft is tilted upwards and the aircraft is beginning to pull up. In the example shown, wings 712 and 714 further tilt away from the nose of the aircraft. Rotors 716 and 718 may be at full power.

Position 720 may illustrate a final stage of descent. The nose of the aircraft as shown is sharply angled away from ground. The aircraft may be in a full upwards tilt position, e.g. tilted as far as the aircraft controls or actuators allow. The trajectory of the aircraft may allow it to slow down before touching down. The surface of the wings may provide drag that aids in slowing the aircraft. Wings 722 and 724 as shown are in a fully tilted position. The wings are perpendicular to the aircraft. Rotors 726 and 728 face upwards and are parallel to the fuselage of the aircraft. The rotors may be powered at maximum power, pulling the aircraft backwards and away from ground.

In some embodiments, the aircraft drops in an arc from position 720 to ground in position 730. In a final stage of descent, the aircraft may be incapable of generating enough lift to counteract gravity. The aircraft may generate an amount of lift that helps slow the descent of the aircraft. Wings of the aircraft may be stalled while also producing a lift factor that slows down the aircraft. The wings may produce attached lift. The aircraft may set down as the attached lift dies out. In the final stage of descent, abortion of the final stage of descent may be impossible. In some embodiments, the aircraft has a thrust to weight ratio of 1 or greater before the final stage of descent. The aircraft may have a thrust to weight ratio of less than 1 but substantially close to 1 (e.g. 0.9) during the final stage of descent.

The final stage of descent may be very short, for example, a few seconds. The power surge landing system may enable an aircraft to touch down with little or no forward speed without hovering. The power surge landing system may enable an aircraft that is incapable of hover to land at a specific planned location with little or no skidding or rolling.

In some embodiments, the power surge landing system tracks the aircraft's power levels. The system may determine a time or position to begin initial descent based on a desired landing location. The time or position may be calculated in order to ensure the aircraft will have a sufficient amount of power to carry out the final stage of descent. In the event the system detects that the aircraft does not have enough power to carry out the final stage of descent, the power surge landing may be aborted. The system may abort during the initial stage of descent (i.e. cruise descent). Aborting the power surge landing may comprise allowing the aircraft to perform a rolling or skidding landing. The aircraft may cruise descend until it reaches ground. The aircraft may land with significant forward speed.

The system may recalculate and change the course of the aircraft's landing after beginning initial descent. For example, the system may adjust the aircraft's trajectory based on disturbances. Disturbances may cause the aircraft to veer from its commanded or predicted trajectory. In the event the aircraft is at a higher altitude than it was commanded to be or expected to be during landing, the system may command the aircraft to be tilted back earlier in landing. Less power than originally calculated may be applied. In the event the aircraft is approaching land at a lower altitude than expected or commanded, the system may command the aircraft to tilt less than originally commanded and maximize power. In some embodiments, the system determines a required power level, degree of tilt of the aircraft, or related instructions for aircraft actuators based on a net loss of lift. The net loss of lift counteracting gravity on the wing may be measured, predicted, or both.

In position 730, the aircraft has landed. The wheels of the aircraft may have touched ground. After the aircraft touches ground, throttle levels may be turned to zero. Rotors 736 and 738 are parallel to the fuselage of the aircraft. Wings 732 and 734 are fully tilted.

The overall directionality of the aircraft may change rapidly during descent. In initial descent, the angle of the aircraft may be 15-30 degrees from parallel to ground. The aircraft may be directed towards ground. As final descent begins, the angle may begin to increase in a direction away from ground. In final descent, the aircraft may be angled roughly 45 degrees away from ground. The aircraft may be parallel to ground after it touches down. The said angle changes may be associated in an approach in which wing tilt is not used or is used minimally. They may be substantially more level in a case in which significant wing tilt is used.

Figure 7B:
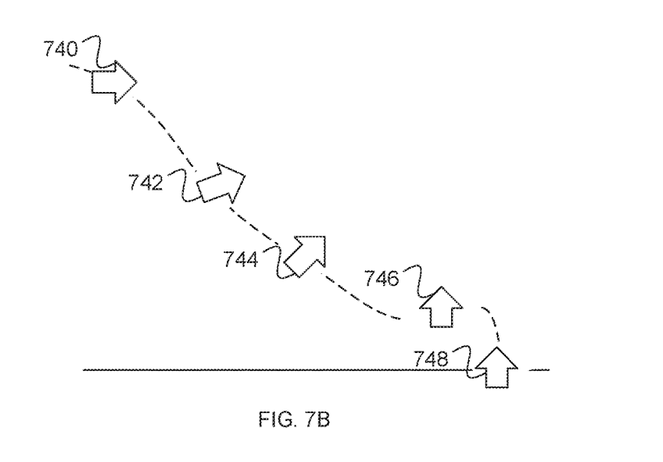
FIG. 7B is a diagram illustrating an embodiment of wing positioning enacted by a power surge landing system.

FIG. 7B is a diagram illustrating an embodiment of wing positioning enacted by a power surge landing system. In position 740, descent has not started. The wing edge faces towards the nose of the aircraft. As descent begins, the leading wing edge is tilted upwards in position 742. As initial descent begins, the wing is further tilted in position 744. When the power surge is applied to slow down the aircraft, the wings are completely tilted in position 746. The wings remain in a fully tilted upon landing in position 748.

Figure 8:
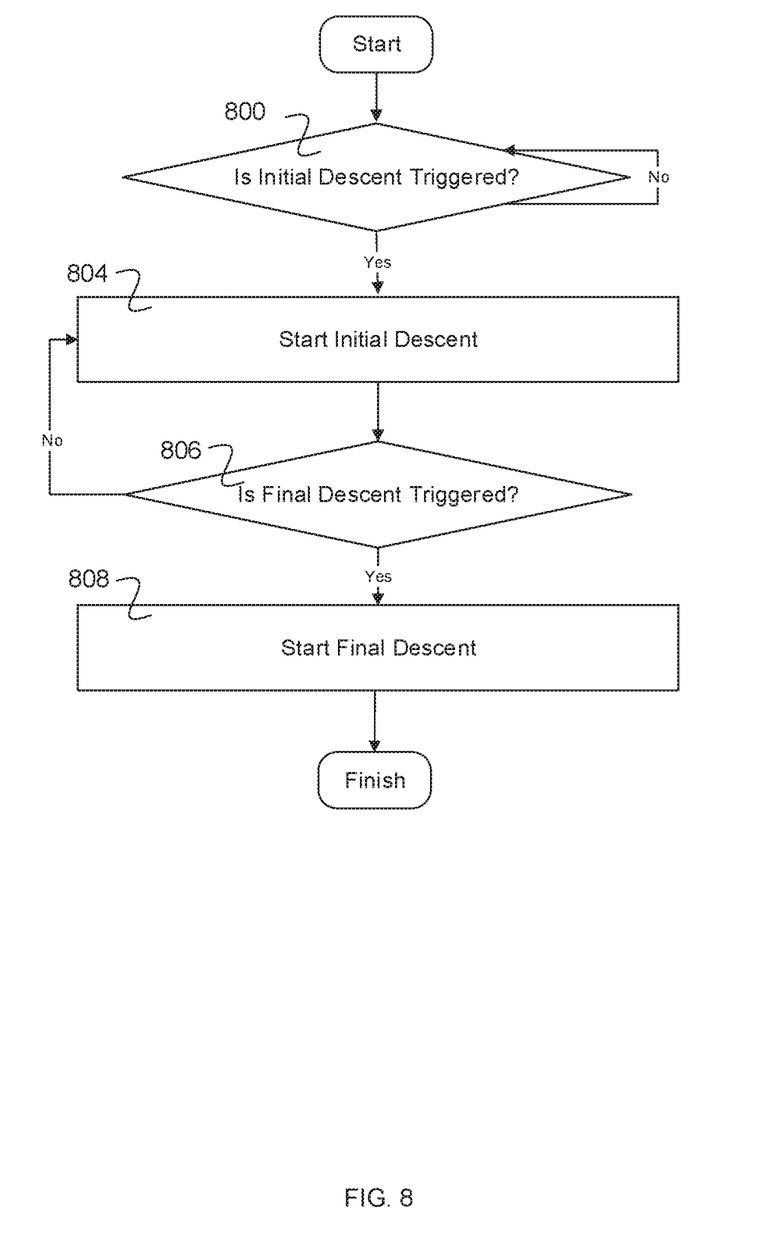
FIG. 8 is a flow diagram illustrating an embodiment of a power surge landing system process.

FIG. 8 is a flow diagram illustrating an embodiment of a power surge landing system process. In some embodiments, FIG. 8 illustrates a basic process. In 800, it is determined whether initial descent is triggered. The system may determine whether initial descent is triggered based on sensor data or manual inputs. In the event initial descent is triggered, in 804 initial descent is started. For example, the aircraft may begin to dive towards ground. In 806, it is determined whether final descent is triggered. In the event final descent is not triggered, the process returns to 804. In the event final descent is triggered, in 808 the system starts final descent. The system may apply a power surge and pull the aircraft sharply away from ground to slow the aircraft in preparation for landing.

Figure 9:
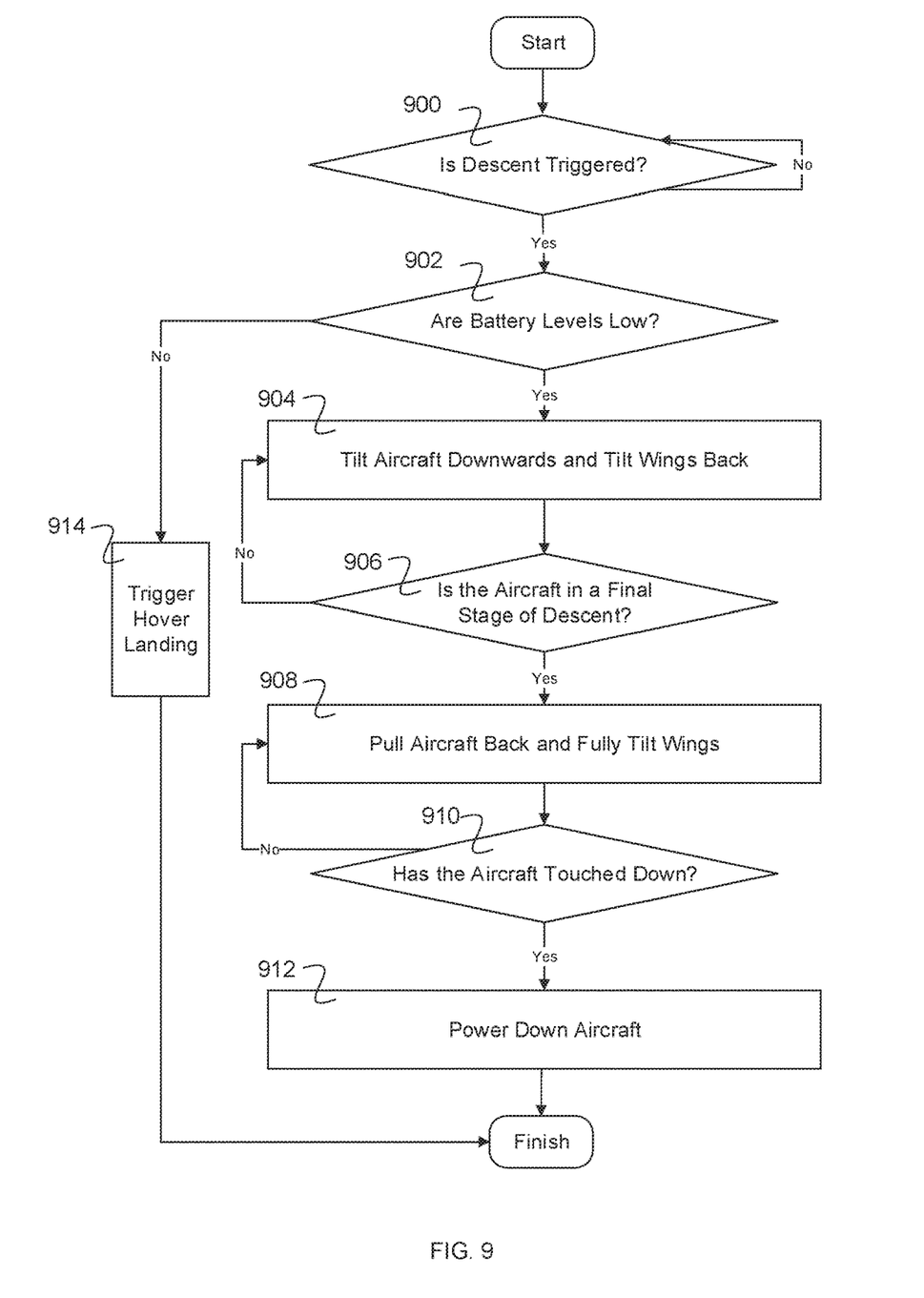
FIG. 9 is a flow diagram illustrating an embodiment of a power surge landing system process.

FIG. 9 is a flow diagram illustrating an embodiment of a power surge landing system process. The process is detailed for a tiltwing aircraft. In 900, it is determined whether descent is triggered. In the event descent is not triggered, the process repeats 900. In some embodiments, the process may pause for a predetermined amount of time before repeating 900.

In the event descent is triggered, the process proceeds to 902. Descent may be triggered based on a manual indication or sensor data. In 902, it is determined whether battery levels are low. In the event battery levels are not low, in 914 hover landing is triggered. The process is finished. In some embodiments, a traditional landing method using hover may be used in the event battery levels are not low. A traditional landing method may be used for pilots that are not familiar with the power surge process. In the event battery levels are low, a traditional landing method may be unsafe or unfeasible. In some embodiments, 902 is not present in a power surge landing system process.

In the event battery levels are low or 902 is not considered, in 904 the aircraft is tilted downwards. In the event the aircraft is a tilt wing aircraft, the wings may be tilted back. In 906, it is determined whether the aircraft is in a final stage of descent. Determining whether the aircraft is in a final stage of descent may comprise consolidating and analyzing environmental information, relative positioning of the aircraft, and a desired landing location. In the event the aircraft is not in a final stage of descent, the process returns to 904. The aircraft may remain in its initial descent positioning for the majority of the duration of the landing. In the event the aircraft is in a final stage of descent, in 908 the aircraft is pulled back and its wings are fully tilted. In 910, it is determined whether the aircraft has touched down. In the event the aircraft has not touched down, the process returns to 908. In the event the aircraft has touched down, in 912 the aircraft is powered down. For example, throttle may be set to zero. The process is finished.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An aircraft landing system, comprising:
   a processor configured to:
      determine to start a final stage of descent for the aircraft;
      determine a set of commands for actuators of the aircraft, based on the determination to start the final stage of descent, to flare the aircraft while wings of the aircraft are substantially in a forward flight position followed by transitioning to a vertical tilt position and completing the landing in substantially vertical flight; and
      provide the set of commands to the actuators.

2. The system of claim 1, wherein the set of commands are determined based at least in part on a net loss of lift.

3. The system of claim 1, wherein the processor automatically determines to start a final stage of descent for the aircraft in the event the aircraft is substantially close to ground.

4. The system of claim 1, wherein the processor is configured to automatically determine to start an initial stage of descent for the aircraft.

5. The system of claim 4, wherein the initial stage of descent for the aircraft comprises a low power stage and the final stage of descent for the aircraft comprises a high power stage.

6. The system of claim 4, wherein the final stage of descent for the aircraft occurs in a shorter amount of time than the initial stage of descent.

7. The system of claim 4, comprising an interface configured to receive sensor data, wherein a determination to start a stage of descent for the aircraft is based at least in part on the sensor data.

8. The system of claim 4, wherein a determination to start a stage of descent for the aircraft is determined based at least in part on manual controls.

9. The system of claim 7, wherein the sensor data is collected using radar, lidar, or a camera.

10. The system of claim 4, wherein the initial stage of descent comprises diving.

11. The system of claim 4, wherein the aircraft is in a cruise position in the initial stage of descent.

12. The system of claim 1, wherein the aircraft comprises one or more wings that are able to tilt during flight.

13. The system of claim 1, wherein the aircraft comprises two parallel tiltwings that each comprise two rotors positioned on leading edges of the tiltwings.

14. The system of claim 12, wherein a leading edge of the one or more wings is shallowly angled upwards away from a nose of the aircraft in an initial stage of descent.

15. The system of claim 12, wherein a leading edge of the one or more wings is fully tilted and perpendicular to a fuselage of the aircraft in the final stage of descent.

16. The system of claim 13, wherein all rotors are parallel to a fuselage of the aircraft and are positioned over the fuselage of the aircraft in the final stage of descent.

17. The system of claim 13, wherein all rotors are at maximum throttle in the final stage of descent.

18. The system of claim 1, wherein throttle is set to zero in the event the aircraft touches ground.

19. A method for landing an aircraft, comprising:
   determining to start a final stage of descent for the aircraft;
   determining a set of commands for actuators of the aircraft, based on the determination to start the final stage of descent, to flare the aircraft while wings of the aircraft are substantially in a forward flight position followed by transitioning to a vertical tilt position and completing the landing in substantially vertical flight; and
   providing the set of commands to the actuators.

20. A computer program product for landing an aircraft, the computer program product being embodied in a non-transitory computer readable storage medium and comprising computer instructions for:
   determining to start a final stage of descent for the aircraft;
   determining a set of commands for actuators of the aircraft, based on the determination to start the final stage of descent, to flare the aircraft while wings of the aircraft are substantially in a forward flight position followed by transitioning to a vertical tilt position and completing the landing in substantially vertical flight; and
   providing the set of commands to the actuators.

* * * * *